(12) United States Patent
Fiornascente

(10) Patent No.: US 8,840,194 B1
(45) Date of Patent: Sep. 23, 2014

(54) VEHICLE WHEEL WITH INTEGRAL INSERTS

(76) Inventor: Nicola Fiornascente, Montclair, NJ (US)

( * ) Notice: Subject to any disclaimer, the term of this patent is extended or adjusted under 35 U.S.C. 154(b) by 0 days.

(21) Appl. No.: 13/223,306

(22) Filed: Aug. 31, 2011

(51) Int. Cl.
*B60B 25/00* (2006.01)

(52) U.S. Cl.
USPC ............. 301/35.632; 301/35.626; 301/64.703

(58) Field of Classification Search
USPC ............. 301/35.626, 35.627, 35.629, 35.632, 301/64.701–64.703; D12/204, 501
See application file for complete search history.

(56) References Cited

U.S. PATENT DOCUMENTS

| | | | | |
|---|---|---|---|---|
| 3,811,737 A | * | 5/1974 | Lejeune | 301/64.703 |
| 3,871,708 A | * | 3/1975 | Richter | 301/35.629 |
| 5,026,122 A | * | 6/1991 | Grubisic et al. | 301/35.625 |
| 5,401,079 A | * | 3/1995 | Rooney | 301/6.91 |
| 5,542,753 A | * | 8/1996 | Plumer | 301/65 |
| 6,183,181 B1 | * | 2/2001 | Leistner et al. | 411/177 |
| 7,040,714 B2 | * | 5/2006 | Schroeder et al. | 301/64.706 |
| 8,001,819 B2 | * | 8/2011 | Mizumura et al. | 72/55 |
| 2002/0089230 A1 | * | 7/2002 | Seimiya | 301/35.627 |
| 2012/0146395 A1 | * | 6/2012 | Silva et al. | 301/64.702 |

* cited by examiner

*Primary Examiner* — Jason Bellinger
(74) *Attorney, Agent, or Firm* — Law Offices Of Mitchell P. Novick

(57) ABSTRACT

Embodiments of this invention comprise a vehicle wheel made primarily of moldable plastic. The portion of the wheel which is physically connected to the rotor is made of metal. The wheel has a plurality of openings spaced to allow air circulation sufficient to provide dissipation of the heat build up which occurs during normal vehicle operation. This improved vehicle wheel securely holds the pneumatic tire and effectively supports the vehicle during operation. Other applications which would benefit by replacing metal wheels and gears with lighter, fully functional wheels and gears are also contemplated by this invention. Another embodiment comprises a method for manufacturing this vehicle wheel.

11 Claims, 3 Drawing Sheets

VEHICLE WHEEL WITH INTEGRAL INSERTS

CROSS REFERENCE TO RELATED APPLICATIONS

N/A

FIELD OF THE INVENTION

Embodiments of the present invention concern wheels for vehicles, more specifically wheels which are not composed entirely of metal.

BACKGROUND OF THE INVENTION

Vehicles for transportation, other than those vehicles which ride on rails, typically roll along the surface on pneumatic tires which are mounted on wheels.

As is well known in the prior art, these wheels have strength properties that prevent deformation of the wheel shape during normal use, which includes resisting compressive forces exerted by the mounted tires; supporting the vehicle's weight; and encountering potholes, rocks, and other objects/obstacles.

In the prior art, these wheels are usually made of metals, such as iron, steel, or aluminum. These metals provide the necessary strength for the wheels. Also, wheels made from these metals can operate despite the heat generated during operation; either these wheels allow for effective dissipation or they are not significantly affected by any heat build-up.

To fabricate the wheels typically requires stamping sheets of these metals into approximately the desired shape of the wheel and then doing additional shaping of the wheel.

There are various drawbacks to these metal wheels. First, the fabrication process is labor intensive and expensive to accommodate its various steps.

Second, when mass-producing metal wheels, due to typical cost and speed concerns of the fabrication process, there are significant limitations on the possible variations and designs of the wheels. One may fabricate customized wheels at a significantly higher cost.

Third, these metal wheels are relatively heavy. These wheels add noticeably to the vehicle's total weight. Because the energy needed to move the vehicle is directly related to the vehicle's weight, heavy wheels increase the energy needed to operate the vehicle. This results in higher energy costs, and consequently higher operating costs, for the vehicle.

Thus, lighter vehicle wheels are desirable, as long as such wheels retain the strength and heat-resistant characteristics of these metal wheels.

In the prior art, there are numerous devices and methods that have been employed to this decrease the weight of vehicle wheels alone. For example, the wheels have been fabricated from lighter metals or include numerous cutouts to eliminate unneeded material. However, the wheels still need to have the appropriate minimum strength. Thus, using these approaches, the amount of weight that can be eliminated is small.

Similarly, other prior art attempts at producing a lighter vehicle have not focused on modifying the vehicle wheels. In this vein, representative prior art includes the following United States Patents:

Lanker, "Lightweight Electric Vehicle", U.S. Pat. No. 5,343,973, issued on Sep. 6, 1994; and
Ghidella et al., "Motor Vehicle Body", U.S. Pat. No. 4,355,841, issued on Oct. 26, 1982.

Thus, there is a need for lighter vehicle wheels, which retain the strength and heat-resistant characteristics of these metal wheels.

BRIEF SUMMARY OF THE INVENTION

One object of this invention is a vehicle wheel that is made of a moldable material.

Another object of this invention is a vehicle wheel that is made primarily of non-metal materials.

Still another object of this invention is a primarily non-metal vehicle wheel that provides the strength necessary for normal vehicle operations.

Yet another object of this invention is a primarily non-metal vehicle wheel that provides the heat resistance necessary for normal vehicle operations.

Still another object of this invention is a set of primarily plastic wheels for a vehicle such that the set provides the strength necessary to carry the weight of the vehicle.

Embodiments of this invention comprise a vehicle wheel made primarily of moldable plastic. The portion of the wheel which is physically connected to the rotor is made of metal. The wheel has a plurality of holes spaced to allow air circulation sufficient to provide dissipation of the heat build up which occurs during normal vehicle operation. This improved vehicle wheel securely holds the pneumatic tire and effectively supports the vehicle during operation.

Other embodiments of this invention comprise an improved vehicle wheel allowing for easy customization of the wheel design.

Further embodiments of this invention comprise a method for manufacturing a primarily non-metal vehicle wheel.

DETAILED DESCRIPTION OF THE INVENTION

Figure 1:
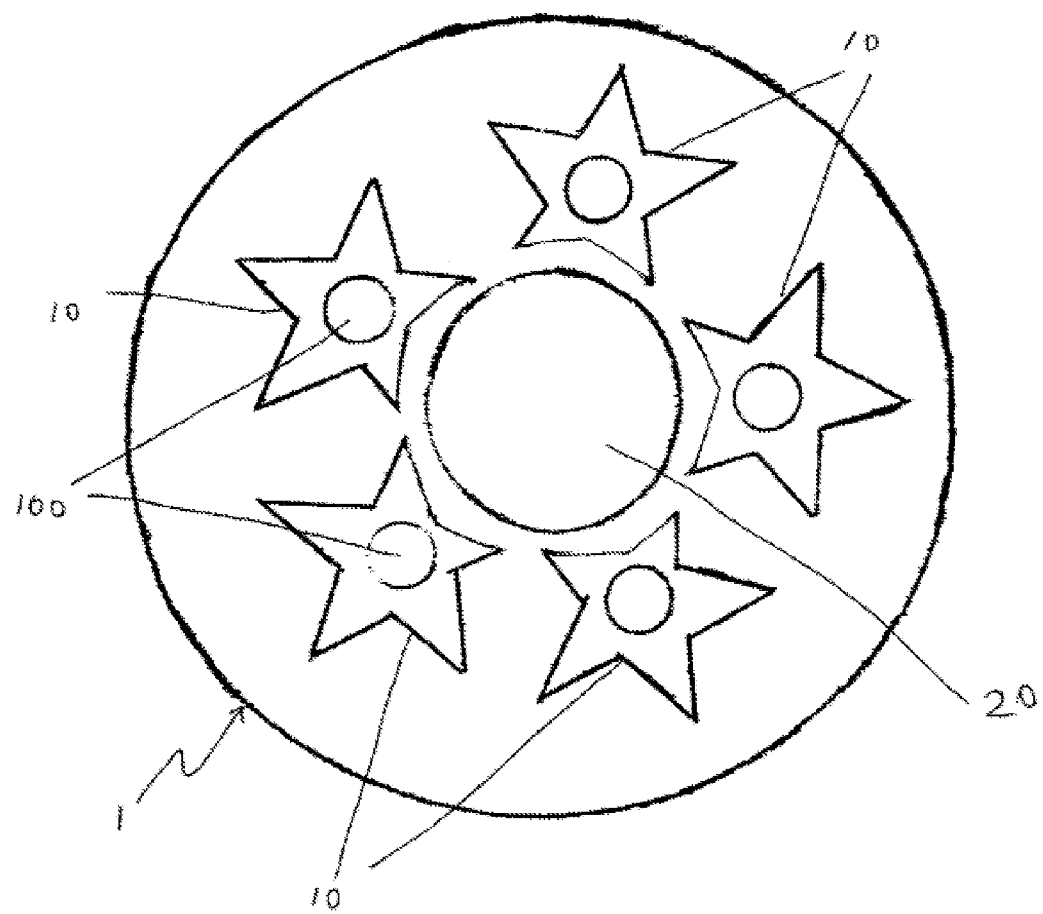
FIG. 1 is top view of one embodiment of the vehicle wheel.
Figure 2:
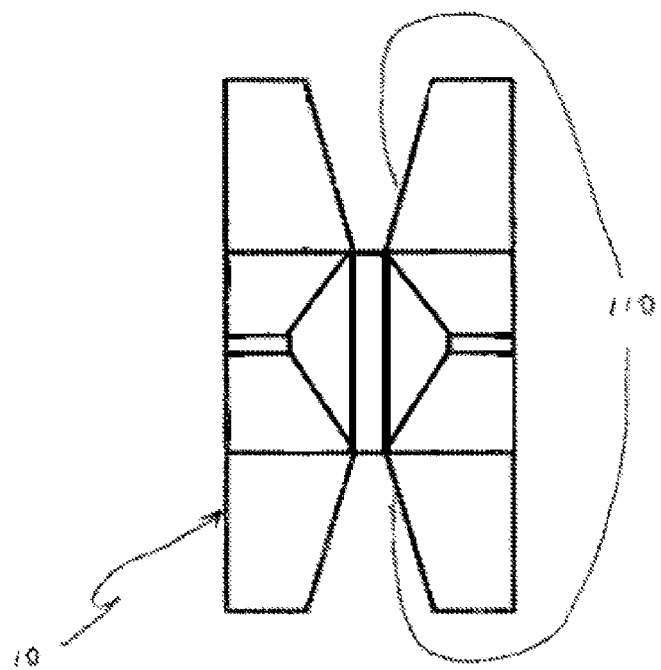
FIG. 2 is a side view of one embodiment of a grip.
Figure 3:
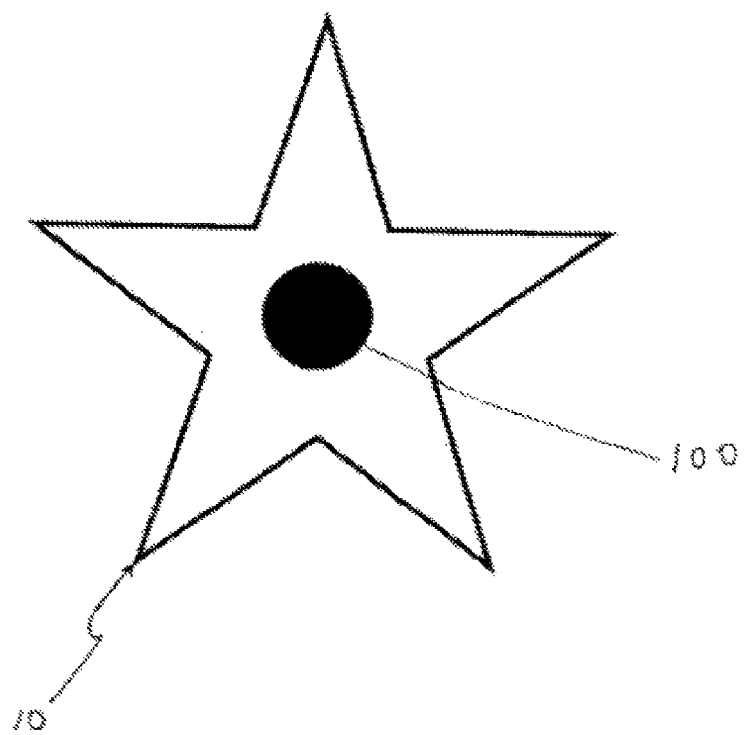
FIG. 3 is a front view of the grip as shown in FIG. 2.

A preferred embodiment of this invention comprises a vehicle wheel 1 made primarily of non-metal materials. Preferably, the wheel 1 is comprised of a combination of heavy duty plastic. For extra strength, the plastic is mixed with one or more of the following: shredded nylon rope, thin stainless wire, or thin shredded copper wire. This rope or wire helps eliminate cracks in the wheel on impact. The wheel 1 is formed in a molding process.

At the center of the wheel 1 are a plurality of grips 10. These grips 10 are where the wheel 1 attaches to the rotor 2. The number of grips 10 is the same as the number of mounting bolts or lugs 30 on the rotor 2. Thus, for most passenger vehicles, there will be five grips 10.

At the center of each grip 10 is an opening 100, preferably round, to accommodate a corresponding lug 30. The grips 10 are positioned so that each lug 30 is accommodated by one of the openings 100. Each grip 10 is preferably made of aluminum or steel; if steel, it is preferably stainless steel. The shape of the outer perimeter of each grip 10 is designed to maximize the size of the surface of contact between the grip and the rim wheel while keeping manufacturing simple; a preferred shape is a five-pointed star outline. The thickness of each grip 10 is chosen to accommodate standard vehicle rim. Thus, for example, for a passenger automobile, the preferred thickness of each grip 10 is about 1½ inches. For bigger vehicles, such as trucks, the preferred thickness of each grip 10 is about 2 inches.

Around the middle of the thickness of each grip 10 is a notch 110. In the star-shaped embodiment of the grip 10, the notch 110 is present along the thickness of each of the star's points. The notch 110 adds extra surface area to the joint between the corresponding grip 10 and the rim wheel 1, thereby producing a stronger bond between these parts.

Each grip 10 is inserted into the center of the rim wheel 1 at the time of molding. The method of such insertion may be either by pressing or using an anchor (e.g., screws) as the wheel 1 is being formed. Both of these methods are well known in the prior art. Alternatively, attachment may be accomplished by other methods well known in the prior art.

For a passenger vehicle, in which the rim wheel 1 is about 8 inches in diameter, the grips 10 are preferably spaced apart about 1 inch around a circle surrounding the wheel hub 20. For a larger vehicle, such as a truck, in which the rim wheel 1 is about 10 inches in diameter, the grips 10 are preferably spaced apart about 2 inches around a circle surrounding the wheel hub 20. The larger spacing allows for additional plastic between grips 10 and, thereby, more strength in the wheel 1 itself.

The rim of the wheel 1 can also be designed with spokes or other types of openings, to improve air circulation and heat dissipation.

The wheel 1 may be used with existing rotors 2 or with specially designed rotors 2. When installed on existing rotors 2, certain modifications are preferred to provide adequate heat dissipation/ventilation during operation. At the time of installation, these wheels 1 preferably have placed 4 to 6 washers, one on each screw, between the wheel 1 and the rotor 2; these washers may be placed upon the lugs 30 that protrude from typical rotors 2. These washers have a preferred thickness between about ⅛ inch to about 1¼ inch round.

Figure 4:
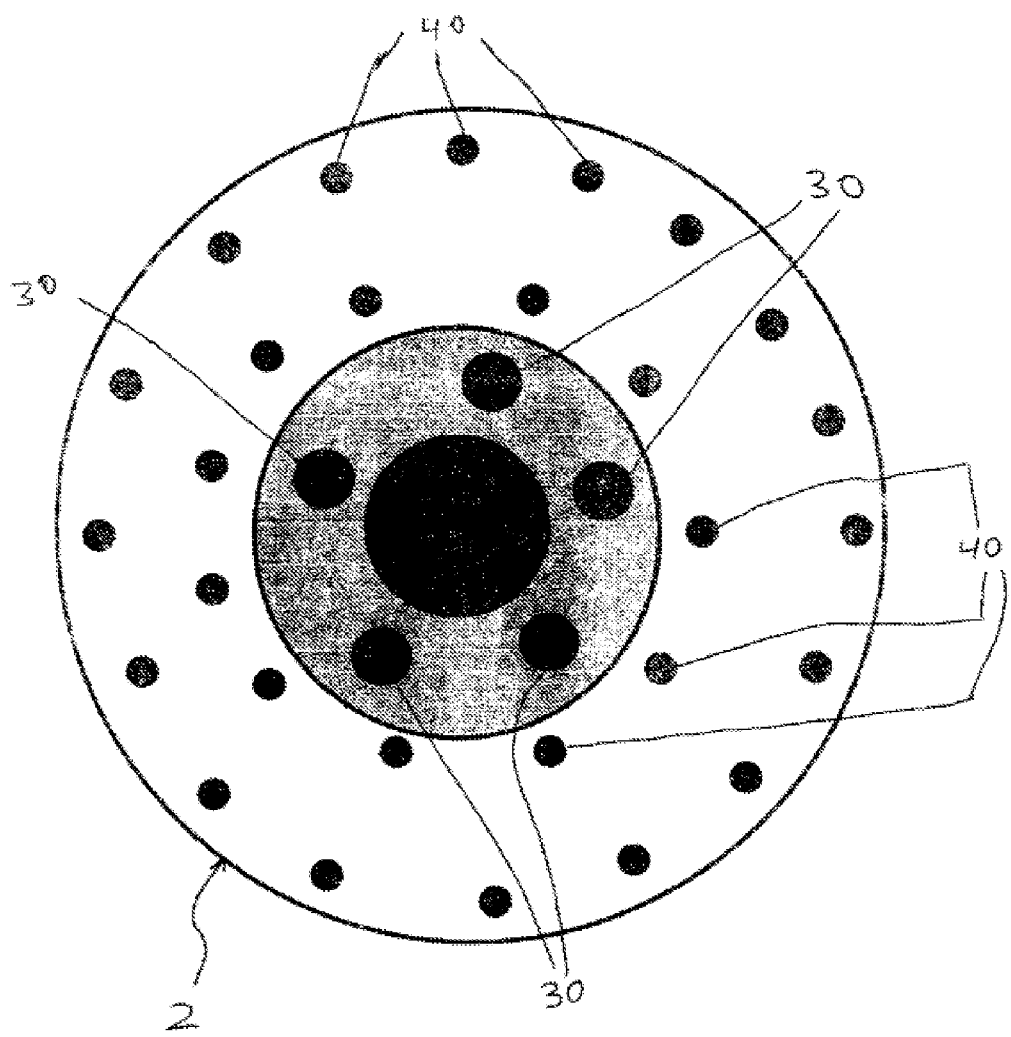
FIG. 4 is a perspective view of one embodiment of a rotor with ventilation holes.

Also, the rotor 2 should also have preferably 10 or 12 openings 40 around the hub, which are preferably approximately evenly spaced apart. These openings 40 are preferably round. Any other number of openings 40 may be used, as long as it allows for adequate air circulation without compromising the structural strength of the rotor 2 (see FIG. 4). Further, there may be a different number of openings 40 depending on the diameter of the rotor 2; the number of openings 40 is chosen to provide air circulation around and through the rotor 2, adequate to keep the wheel 1 from rising above a threshold temperature which will soften and/or otherwise compromise the strength of the wheel 1. Preferably, the threshold temperature is approximately between 100-110 degrees F.

Alternatively, specially designed rotors 2 may include in the rotor molding the openings 40 and also shapes to simulate the spacing effect of the washers.

For final aesthetics, the rim wheels 1 may be painted as desired. Preferably, hard plastic paint is used. Alternatively, the wheels 1 may be chrome plated or bright nickel electroplated.

In use, the wheels 1 replace convention vehicle wheels by being mounting on the existing rotors 2 or on specially designed replacement rotors 2 as described above. The existing rotor 2 or new rotor 2 must be this design in order to work with this invention (see FIG. 4). Alternatively, one could use an existing rotor 2 by adding openings 40 over the surface of the rotor 2 to provide adequate air circulation (see above discussion on air circulation).

Thus, via this invention, vehicles have lighter, fully functional wheels 1.

Although this invention has been described with a certain degree of particularity, it is to be understood that the present disclosure has been made only by way of illustration, and that numerous changes in the details and arrangement of parts may be resorted to without departing from the spirit and scope of the invention.

Consequently, this invention need not be limited to automobiles and small trucks. Other applications which would benefit by replacing metal wheels and gears with lighter, fully functional wheels and gears are also contemplated by this invention. For example, this invention can also be used for a variety of other wheel applications, such as machine use and belt drives for air conditioners. Also, mass production of this invention will allow for many other applications.

I claim:

1. A vehicle wheel to be mounted on a plurality of mounting bolts, the wheel comprising:
    a plurality of mounting portions, each mounting portion corresponding to and located relative to one of the mounting bolts;
    each of the mounting portions having an opening internal to the mounting portion through which an end of the corresponding mounting bolt can pass;
    each of the mounting portions having an outer perimeter being star-shaped; and
    each of the mounting portions embedded in a wheel-shaped structure, the mounting portions being distinguishable from the wheel-shaped structure;
    wherein said mounting portions comprise a pair of radially extending flanges which are axially spaced on a central body, said flanges forming said star-shaped outer periphery; each flange comprising a tapered surface, with said tapered surfaces cooperating to form a notch located axially between said flanges.

2. A vehicle wheel as described in claim 1, wherein the mounting portions comprise a first material and the wheel-shaped structure comprises a second material;
    the first material being different from the second material.

3. The vehicle wheel as described in claim 2, wherein the wheel-shaped structure is comprised of plastic.

4. The vehicle wheel as described in claim 3, wherein each mounting portion is comprised of metal.

5. A vehicle wheel as described in claim 2, wherein each internal opening has an axis perpendicular to a surface of the wheel and said notch is perpendicular to the axis of the opening.

6. A vehicle wheel as described in claim 2, wherein each of the internal openings is circular.

7. The vehicle wheel as described in claim 2, wherein the mounting bolts are connected to a rotor.

8. The vehicle wheel as described in claim 7, wherein the rotor contains a plurality of internal rotor vents.

9. The vehicle wheel as described in claim 7, wherein the wheel further comprises an additional venting open channel created by a washer located around one of the mounting bolts between the corresponding mounting portion and the rotor.

10. A vehicle wheel to be mounted on a rotor, the rotor comprising a plurality of mounting bolts, the wheel comprising:
    a plurality of metal mounting portions, each mounting portion corresponding to and located relative to one of the mounting bolts;
    each of the mounting portions having an opening internal to the mounting portion through which an end of the corresponding mounting bolt can pass;
    each of the mounting portions having an outer perimeter being star-shaped;

each of the mounting portions embedded in a plastic wheel-shaped structure;

the wheel-shaped structure having a circular outer rim; and the rim being engageable with a vehicle tire;

wherein said mounting portions comprise a pair of radially extending flanges which are axially spaced on a central body, said flanges forming said star-shaped outer periphery; each flange comprising a tapered surface, with said tapered surfaces cooperating to form a notch located axially between said flanges.

11. A method for manufacturing a vehicle wheel to be mounted on a rotor, the rotor comprising a plurality of mounting bolts, the method comprising the steps of:

inserting into a wheel-shaped structure comprising a second material, a plurality of mounting portions each having an internal mounting opening corresponding to, located relative to, and able to accommodate one of the mounting bolts, the mounting portions comprising a first material, the first material being different from the second material, each of the mounting portions having an outer perimeter being star-shaped; and securing the mounting portions to the wheel-shaped structure;

wherein said mounting portions comprise a pair of radially extending flanges which are axially spaced on a central body, said flanges forming said star-shaped outer periphery; each flange comprising a tapered surface, with said tapered surfaces cooperating to form a notch located axially between said flanges.

\* \* \* \* \*